United States Patent
Rodgers et al.

(10) Patent No.: US 9,683,740 B2
(45) Date of Patent: Jun. 20, 2017

(54) METHODS FOR HANDLING COAL PROCESSING EMISSIONS AND ASSOCIATED SYSTEMS AND DEVICES

(71) Applicant: SunCoke Technology and Development LLC, Lisle, IL (US)

(72) Inventors: Bradley Thomas Rodgers, Glen Carbon, IL (US); Justin Prien, Glendale, MO (US); Matt Gill, Lisle, IL (US); John Francis Quanci, Haddonfield, NJ (US); Jacob Peter Sarpen, Chicago, IL (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 408 days.

(21) Appl. No.: 13/631,215

(22) Filed: Sep. 28, 2012

(65) Prior Publication Data
US 2014/0033917 A1    Feb. 6, 2014

Related U.S. Application Data

(60) Provisional application No. 61/678,018, filed on Jul. 31, 2012.

(51) Int. Cl.
*B01D 45/00*    (2006.01)
*F23J 15/06*    (2006.01)
(Continued)

(52) U.S. Cl.
CPC .............. *F23J 15/06* (2013.01); *B01D 45/08* (2013.01); *B01D 45/12* (2013.01); *B01D 45/16* (2013.01);
(Continued)

(58) Field of Classification Search
CPC   F23J 15/06; F23J 15/022; F23J 15/006; F23J 2217/20; F23J 2217/40;
(Continued)

(56) References Cited

U.S. PATENT DOCUMENTS

| 469,868 A | 3/1892 | Thomas et al. |
| 1,140,798 A | 5/1915 | Carpenter |

(Continued)

FOREIGN PATENT DOCUMENTS

| CA | 1172895 | 8/1984 |
| CA | 2775992 A1 | 5/2011 |

(Continued)

OTHER PUBLICATIONS

JP 03-197588, Inoqu Keizo et al., Method and Equipment for Boring Degassing Hole in Coal Charge in Coke Oven, Japanese Patent (Abstract Only) Aug. 28, 1991.

(Continued)

*Primary Examiner* — Dung H Bui
(74) *Attorney, Agent, or Firm* — Perkins Coie LLP

(57) ABSTRACT

The present technology describes various embodiments of systems and methods for handling emissions. More specifically, some embodiments are directed to systems and methods for collecting heated particulate from a coal processing system. In one embodiment, a method of handling emissions from a coal processing system includes inletting the emissions into a duct. The emissions include heated particulate. The method further includes slowing a speed of the emissions traveling through the duct and disengaging the heated particulate from the emissions without the use of a physical barrier. In some embodiments, the heated particulate is slowed, cooled, and diverted from an emissions pathway into a collection bin.

6 Claims, 2 Drawing Sheets

(51) Int. Cl.
| | |
|---|---|
| *B01D 45/08* | (2006.01) |
| *B01D 45/16* | (2006.01) |
| *B01D 45/12* | (2006.01) |
| *F23J 15/00* | (2006.01) |
| *F23J 15/02* | (2006.01) |
| *B01D 50/00* | (2006.01) |
| *B03C 3/41* | (2006.01) |

(52) U.S. Cl.
CPC .......... *F23J 15/006* (2013.01); *F23J 15/022* (2013.01); *B01D 50/002* (2013.01); *B03C 3/41* (2013.01); *F23J 2217/101* (2013.01); *F23J 2217/102* (2013.01); *F23J 2217/20* (2013.01); *F23J 2217/40* (2013.01); *F23J 2217/60* (2013.01); *Y02E 20/363* (2013.01)

(58) Field of Classification Search
CPC ............... F23J 2217/101; F23J 2217/60; F23J 2217/102; Y02E 20/363; B01D 45/08; B01D 45/16; B01D 45/12; B01D 50/002; B03C 3/41
USPC .. 55/428.1, 429, 434.2, 434.4, 315.1, 315.2; 95/17, 26, 272; 96/15, 25, 52, 57, 42
See application file for complete search history.

(56) References Cited

U.S. PATENT DOCUMENTS

| | | |
|---|---|---|
| 1,424,777 A | 8/1922 | Schondeling |
| 1,430,027 A | 9/1922 | Plantinga |
| 1,572,391 A | 2/1926 | Klaiber |
| 1,721,813 A | 7/1929 | Rudolf et al. |
| 1,818,370 A | 8/1931 | Wine |
| 1,818,994 A * | 8/1931 | Kreisinger ............ B01D 45/16 55/338 |
| 1,848,818 A | 3/1932 | Becker |
| 1,955,962 A | 4/1934 | Jones |
| 2,075,337 A * | 3/1937 | Burnaugh ............ F23J 15/022 126/280 |
| 2,394,173 A | 2/1946 | Harris et al. |
| 2,424,012 A | 7/1947 | Bangham et al. |
| 2,667,185 A | 1/1954 | Beavers |
| 2,723,725 A * | 11/1955 | Keiffer ................. B01D 45/08 55/291 |
| 2,756,842 A * | 7/1956 | Chamberlin ........... B03C 3/011 266/147 |
| 2,873,816 A * | 2/1959 | Umbricht ............. B01D 45/16 261/112.1 |
| 2,902,991 A | 9/1959 | Whitman |
| 3,015,893 A | 1/1962 | McCreary |
| 3,033,764 A | 5/1962 | Hannes |
| 3,462,345 A | 8/1969 | Kernan |
| 3,511,030 A * | 5/1970 | Brown ..................... B03C 3/66 96/25 |
| 3,545,470 A | 12/1970 | Paton |
| 3,616,408 A | 10/1971 | Hickam |
| 3,652,403 A | 3/1972 | Knappstein et al. |
| 3,676,305 A | 7/1972 | Cremer |
| 3,709,794 A | 1/1973 | Kinzler et al. |
| 3,710,551 A * | 1/1973 | Sved ..................... B01D 45/16 261/119.1 |
| 3,746,626 A | 7/1973 | Morrison, Jr. |
| 3,748,235 A | 7/1973 | Pries |
| 3,784,034 A | 1/1974 | Thompson |
| 3,806,032 A | 4/1974 | Pries |
| 3,836,161 A | 9/1974 | Buhl |
| 3,839,156 A | 10/1974 | Jakobi et al. |
| 3,844,900 A | 10/1974 | Schulte |
| 3,857,758 A | 12/1974 | Mole |
| 3,875,016 A | 4/1975 | Schmidt-Balve et al. |
| 3,876,506 A | 4/1975 | Dix et al. |
| 3,878,053 A | 4/1975 | Hyde |
| 3,894,302 A | 7/1975 | Lasater |
| 3,897,312 A | 7/1975 | Armour et al. |
| 3,906,992 A | 9/1975 | Leach |
| 3,912,091 A | 10/1975 | Thompson |
| 3,917,458 A | 11/1975 | Polak |
| 3,928,144 A | 12/1975 | Jakimowicz |
| 3,930,961 A | 1/1976 | Sustarsic et al. |
| 3,957,591 A | 5/1976 | Riecker |
| 3,959,084 A | 5/1976 | Price |
| 3,963,582 A | 6/1976 | Helm et al. |
| 3,969,191 A | 7/1976 | Bollenbach et al. |
| 3,975,148 A | 8/1976 | Fukuda et al. |
| 3,984,289 A | 10/1976 | Sustarsic et al. |
| 4,004,702 A | 1/1977 | Szendroi |
| 4,004,983 A | 1/1977 | Pries |
| 4,040,910 A | 8/1977 | Knappstein et al. |
| 4,059,885 A | 11/1977 | Oldengott |
| 4,067,462 A | 1/1978 | Thompson |
| 4,083,753 A | 4/1978 | Rogers et al. |
| 4,086,231 A | 4/1978 | Ikio |
| 4,100,033 A | 7/1978 | Holter |
| 4,111,757 A | 9/1978 | Ciarimboli |
| 4,124,450 A | 11/1978 | MacDonald |
| 4,145,195 A | 3/1979 | Knappstein et al. |
| 4,147,230 A | 4/1979 | Ormond et al. |
| 4,162,546 A | 7/1979 | Shortell et al. |
| 4,189,272 A | 2/1980 | Gregor et al. |
| 4,194,951 A | 3/1980 | Pries |
| 4,196,053 A | 4/1980 | Grohmann |
| 4,211,608 A | 7/1980 | Kwasnoski et al. |
| 4,213,489 A | 7/1980 | Cain |
| 4,213,828 A | 7/1980 | Calderon |
| 4,222,748 A | 9/1980 | Argo et al. |
| 4,225,393 A | 9/1980 | Gregor et al. |
| 4,235,830 A | 11/1980 | Bennett et al. |
| 4,239,602 A | 12/1980 | La Bate |
| 4,248,671 A | 2/1981 | Belding |
| 4,249,997 A | 2/1981 | Schmitz |
| 4,263,099 A * | 4/1981 | Porter ..................... C10B 39/08 201/39 |
| 4,285,772 A | 8/1981 | Kress |
| 4,287,024 A | 9/1981 | Thompson |
| 4,289,584 A | 9/1981 | Chuss et al. |
| 4,289,585 A | 9/1981 | Wagener et al. |
| 4,296,938 A | 10/1981 | Offermann et al. |
| 4,303,615 A | 12/1981 | Jarmell et al. |
| 4,307,673 A | 12/1981 | Caughey |
| 4,314,787 A | 2/1982 | Kwasnik et al. |
| 4,330,372 A | 5/1982 | Cairns et al. |
| 4,334,963 A | 6/1982 | Stog |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,366,029 A | 12/1982 | Bixby et al. |
| 4,373,244 A | 2/1983 | Mertens et al. |
| 4,375,388 A | 3/1983 | Hara et al. |
| 4,392,824 A | 7/1983 | Struck et al. |
| 4,395,269 A | 7/1983 | Schuler |
| 4,396,394 A | 8/1983 | Li et al. |
| 4,396,461 A | 8/1983 | Neubaum et al. |
| 4,431,484 A | 2/1984 | Weber et al. |
| 4,440,098 A * | 4/1984 | Adams ..................... F23G 5/16 110/205 |
| 4,445,977 A | 5/1984 | Husher |
| 4,446,018 A | 5/1984 | Cerwick |
| 4,448,541 A | 5/1984 | Wirtschafter |
| 4,452,749 A | 6/1984 | Kolvek et al. |
| 4,459,103 A | 7/1984 | Gieskieng |
| 4,469,446 A | 9/1984 | Goodboy |
| 4,498,786 A | 2/1985 | Ruscheweyh |
| 4,508,539 A | 4/1985 | Nakai |
| 4,527,488 A | 7/1985 | Lindgren |
| 4,568,426 A | 2/1986 | Orlando et al. |
| 4,570,670 A | 2/1986 | Johnson |
| 4,614,567 A | 9/1986 | Stahlherm et al. |
| 4,643,327 A | 2/1987 | Campbell |
| 4,645,513 A | 2/1987 | Kubota et al. |
| 4,655,193 A | 4/1987 | Blacket |
| 4,655,804 A | 4/1987 | Kercheval et al. |

(56) References Cited

U.S. PATENT DOCUMENTS

| | | | |
|---|---|---|---|
| 4,666,675 A | 5/1987 | Parker et al. | |
| 4,680,167 A | 7/1987 | Orlando et al. | |
| 4,704,195 A | 11/1987 | Janicka et al. | |
| 4,720,262 A | 1/1988 | Durr et al. | |
| 4,726,465 A | 2/1988 | Kwasnik et al. | |
| 4,793,981 A * | 12/1988 | Doyle | B01D 53/60 |
| | | | 423/239.1 |
| 4,824,614 A | 4/1989 | Jones et al. | |
| 4,919,170 A | 4/1990 | Kallinich et al. | |
| 4,929,179 A | 5/1990 | Breidenbach et al. | |
| 4,941,824 A * | 7/1990 | Holter | C10B 45/00 |
| | | | 110/256 |
| 5,052,922 A | 10/1991 | Stokman et al. | |
| 5,062,925 A | 11/1991 | Durselen et al. | |
| 5,078,822 A | 1/1992 | Hodges et al. | |
| 5,087,328 A | 2/1992 | Wegerer et al. | |
| 5,114,542 A | 5/1992 | Childress et al. | |
| 5,227,106 A | 7/1993 | Kolvek | |
| 5,228,955 A | 7/1993 | Westbrook, III | |
| 5,318,671 A | 6/1994 | Pruitt | |
| 5,622,280 A | 4/1997 | Mays et al. | |
| 5,670,025 A | 9/1997 | Baird | |
| 5,687,768 A | 11/1997 | Albrecht et al. | |
| 5,787,821 A * | 8/1998 | Bhat | F23J 15/006 |
| | | | 110/215 |
| 5,810,032 A | 9/1998 | Hong et al. | |
| 5,857,308 A | 1/1999 | Dismore et al. | |
| 5,928,476 A | 7/1999 | Daniels | |
| 5,968,320 A | 10/1999 | Sprague | |
| 6,017,214 A | 1/2000 | Sturgulewski | |
| 6,059,932 A | 5/2000 | Sturgulewski | |
| 6,139,692 A | 10/2000 | Tamura et al. | |
| 6,152,668 A | 11/2000 | Knoch | |
| 6,187,148 B1 | 2/2001 | Sturgulewski | |
| 6,189,819 B1 | 2/2001 | Racine | |
| 6,290,494 B1 | 9/2001 | Barkdoll | |
| 6,412,221 B1 | 7/2002 | Emsbo | |
| 6,596,128 B2 | 7/2003 | Westbrook | |
| 6,626,984 B1 | 9/2003 | Taylor | |
| 6,699,035 B2 | 3/2004 | Brooker | |
| 6,758,875 B2 | 7/2004 | Reid et al. | |
| 6,907,895 B2 | 6/2005 | Johnson et al. | |
| 6,946,011 B2 * | 9/2005 | Snyder | B01D 53/508 |
| | | | 137/896 |
| 6,964,236 B2 | 11/2005 | Schucker | |
| 7,056,390 B2 | 6/2006 | Fratello et al. | |
| 7,077,892 B2 * | 7/2006 | Lee | B01D 45/12 |
| | | | 55/434.4 |
| 7,314,060 B2 | 1/2008 | Chen et al. | |
| 7,331,298 B2 | 2/2008 | Taylor et al. | |
| 7,497,930 B2 | 3/2009 | Barkdoll et al. | |
| 7,611,609 B1 | 11/2009 | Valia et al. | |
| 7,644,711 B2 | 1/2010 | Creel | |
| 7,722,843 B1 | 5/2010 | Srinivasachar | |
| 7,727,307 B2 | 6/2010 | Winkler | |
| 7,803,627 B2 | 9/2010 | Hodges | |
| 7,827,689 B2 | 11/2010 | Crane et al. | |
| 7,998,316 B2 | 8/2011 | Barkdoll et al. | |
| 8,071,060 B2 | 12/2011 | Ukai et al. | |
| 8,079,751 B2 | 12/2011 | Kapila et al. | |
| 8,152,970 B2 | 4/2012 | Barkdoll et al. | |
| 8,236,142 B2 | 8/2012 | Westbrook et al. | |
| 8,266,853 B2 | 9/2012 | Bloom et al. | |
| 8,398,935 B2 | 3/2013 | Howell, Jr. et al. | |
| 2002/0170605 A1 | 11/2002 | Shiraishi et al. | |
| 2003/0014954 A1 * | 1/2003 | Ronning | B01D 45/12 |
| | | | 55/345 |
| 2003/0015809 A1 * | 1/2003 | Carson | F23J 15/06 |
| | | | 261/115 |
| 2006/0102420 A1 | 5/2006 | Huber et al. | |
| 2007/0116619 A1 | 5/2007 | Taylor et al. | |
| 2007/0251198 A1 * | 11/2007 | Witter | B01D 45/12 |
| | | | 55/300 |
| 2008/0028935 A1 | 2/2008 | Andersson | |
| 2008/0169578 A1 | 7/2008 | Crane et al. | |
| 2008/0179165 A1 | 7/2008 | Chen et al. | |
| 2008/0257236 A1 * | 10/2008 | Green | B01D 53/78 |
| | | | 110/215 |
| 2008/0271985 A1 | 11/2008 | Yamasaki | |
| 2008/0289305 A1 * | 11/2008 | Girondi | B01D 46/0012 |
| | | | 55/385.3 |
| 2009/0217576 A1 | 9/2009 | Kim et al. | |
| 2009/0283395 A1 | 11/2009 | Hippe | |
| 2010/0095521 A1 | 4/2010 | Bertini et al. | |
| 2010/0115912 A1 | 5/2010 | Worley | |
| 2010/0287871 A1 | 11/2010 | Bloom et al. | |
| 2011/0048917 A1 | 3/2011 | Kim et al. | |
| 2011/0174301 A1 * | 7/2011 | Haydock | F23J 15/06 |
| | | | 126/85 R |
| 2011/0223088 A1 | 9/2011 | Chang et al. | |
| 2011/0253521 A1 | 10/2011 | Kim | |
| 2012/0024688 A1 | 2/2012 | Barkdoll | |
| 2012/0030998 A1 | 2/2012 | Barkdoll et al. | |
| 2012/0152720 A1 | 6/2012 | Reichelt et al. | |
| 2012/0228115 A1 | 9/2012 | Westbrook | |
| 2012/0247939 A1 | 10/2012 | Kim et al. | |
| 2013/0216717 A1 | 8/2013 | Rago et al. | |
| 2013/0220373 A1 | 8/2013 | Kim | |
| 2013/0306462 A1 | 11/2013 | Kim et al. | |
| 2014/0048273 A1 | 2/2014 | Quanci et al. | |
| 2014/0048404 A1 | 2/2014 | Quanci et al. | |
| 2014/0048405 A1 | 2/2014 | Quanci et al. | |
| 2014/0061018 A1 | 3/2014 | Sarpen et al. | |
| 2014/0083836 A1 | 3/2014 | Quanci et al. | |
| 2014/0182195 A1 | 7/2014 | Quanci et al. | |
| 2014/0182683 A1 | 7/2014 | Quanci et al. | |
| 2014/0183023 A1 | 7/2014 | Quanci et al. | |
| 2014/0183024 A1 | 7/2014 | Chun et al. | |
| 2014/0183026 A1 | 7/2014 | Quanci et al. | |
| 2014/0224123 A1 * | 8/2014 | Walters | B01D 45/08 |
| | | | 95/272 |
| 2014/0262139 A1 | 9/2014 | Choi et al. | |
| 2014/0262726 A1 | 9/2014 | West et al. | |
| 2015/0122629 A1 | 5/2015 | Freimuth et al. | |
| 2015/0247092 A1 | 9/2015 | Quanci et al. | |
| 2015/0287026 A1 | 10/2015 | Yang et al. | |
| 2016/0222297 A1 | 8/2016 | Choi et al. | |

FOREIGN PATENT DOCUMENTS

| | | |
|---|---|---|
| CA | 2822841 | 7/2012 |
| CN | 87107195 A | 7/1988 |
| CN | 2064363 U | 10/1990 |
| CN | 1092457 A | 9/1994 |
| CN | 1255528 A | 6/2000 |
| CN | 1358822 A | 7/2002 |
| CN | 2509188 Y | 9/2002 |
| CN | 2528771 Y | 1/2003 |
| CN | 1468364 A | 1/2004 |
| CN | 2668641 Y | 1/2005 |
| CN | 1957204 A | 5/2007 |
| CN | 101037603 A | 9/2007 |
| CN | 101058731 A | 10/2007 |
| CN | 101157874 A | 4/2008 |
| CN | 100510004 C | 7/2009 |
| CN | 101486017 A | 7/2009 |
| CN | 101497835 A | 8/2009 |
| CN | 202226816 U | 5/2012 |
| CN | 103468289 A | 12/2013 |
| DE | 212176 C | 7/1909 |
| DE | 3315738 A1 | 11/1983 |
| DE | 3231697 C1 | 1/1984 |
| DE | 3329367 C1 | 11/1984 |
| DE | 19545736 A1 | 6/1997 |
| DE | 19803455 C1 | 8/1999 |
| DE | 10154785 A1 | 5/2003 |
| DE | 102005015301 | 10/2006 |
| DE | 102006004669 | 8/2007 |
| DE | 102009031436 A1 | 1/2011 |
| DE | 102011052785 B3 | 12/2012 |
| EP | 0208490 | 1/1987 |
| EP | 2295129 | 3/2011 |

(56) References Cited

FOREIGN PATENT DOCUMENTS

| | | |
|---|---|---|
| FR | 2339664 A1 | 8/1977 |
| GB | 441784 A | 1/1936 |
| GB | 606340 A | 8/1948 |
| GB | 611524 A | 11/1948 |
| GB | 725865 A | 3/1955 |
| GB | 871094 A | 6/1961 |
| JP | 50148405 A | 11/1975 |
| JP | 54054101 A | 4/1979 |
| JP | S5453103 A | 4/1979 |
| JP | 57051786 A | 3/1982 |
| JP | 57051787 A | 3/1982 |
| JP | 57083585 A | 5/1982 |
| JP | 57090092 A | 6/1982 |
| JP | 58091788 A | 5/1983 |
| JP | 59051978 A | 3/1984 |
| JP | 59053589 A | 3/1984 |
| JP | 59071388 A | 4/1984 |
| JP | 59108083 A | 6/1984 |
| JP | 59145281 A | 8/1984 |
| JP | 60004588 A | 1/1985 |
| JP | 61106690 A | 5/1986 |
| JP | 62011794 A | 1/1987 |
| JP | 62285980 | 12/1987 |
| JP | 01103694 A | 4/1989 |
| JP | 01249886 A | 10/1989 |
| JP | H0319127 | 1/1991 |
| JP | H06264062 A | 9/1994 |
| JP | 07188668 | 7/1995 |
| JP | 07216357 | 8/1995 |
| JP | 08127778 | 5/1996 |
| JP | H10273672 A | 10/1998 |
| JP | 2000204373 A | 7/2000 |
| JP | 2001200258 A | 7/2001 |
| JP | 03197588 B2 | 8/2001 |
| JP | 2002106941 A | 4/2002 |
| JP | 200341258 A | 2/2003 |
| JP | 2003071313 A | 3/2003 |
| JP | 2003292968 A | 10/2003 |
| JP | 2003342581 A | 12/2003 |
| JP | 2005263983 A | 9/2005 |
| JP | 2007063420 A | 3/2007 |
| JP | 04159392 B2 | 10/2008 |
| JP | 2008231278 A | 10/2008 |
| JP | 2009144121 A | 7/2009 |
| JP | 2012102302 A | 5/2012 |
| JP | 2013006957 A | 1/2013 |
| KR | 960008754 Y1 | 10/1996 |
| KR | 1019990054426 | 12/1999 |
| KR | 20000042375 A | 7/2000 |
| KR | 1020050053861 A | 6/2005 |
| KR | 100737393 B1 | 7/2007 |
| KR | 10-0797852 | 1/2008 |
| KR | 10-2011-0010452 A | 2/2011 |
| KR | 10-0296700 B1 | 10/2011 |
| KR | 101318388 B1 | 10/2013 |
| SU | 1535880 A1 | 1/1990 |
| TW | 201241166 A1 | 10/2012 |
| WO | WO-9012074 A1 | 10/1990 |
| WO | WO-9945083 A1 | 9/1999 |
| WO | WO2005023649 | 3/2005 |
| WO | WO2005115583 | 12/2005 |
| WO | WO-2007103649 A2 | 9/2007 |
| WO | WO-2008034424 A1 | 3/2008 |
| WO | WO-2010107513 A1 | 9/2010 |
| WO | 2011000447 A1 | 1/2011 |
| WO | WO-2012029979 A1 | 3/2012 |
| WO | 2013023872 A1 | 2/2013 |
| WO | WO2014021909 | 2/2014 |

OTHER PUBLICATIONS

JP 04-159392, Inoue Keizo et al., Method and Equipment for Opening Hole for Degassing of Coal Charge in Coke Oven, Japanese Patent (Abstract Only) Jun. 2, 1992.

International Search Report and Written Opinion of International Application No. PCT/US2012/057980; Date of Mailing: Mar. 28, 2013; 11 pages.

Crelling, et al., "Effects of Weathered Coal on Coking Properties and Coke Quality", Fuel, 1979, vol. 58, Issue 7, pp. 542-546.

Database WPI, Week 199115, Thomson Scientific, Lond, GB; AN 1991-107552.

Diez, et al., "Coal for Metallurgical Coke Production: Predictions of Coke Quality and Future Requirements for Cokemaking", International Journal of Coal Geology, 2002, vol. 50, Issue 1-4, pp. 389-412.

ASTM D5341-99(2010)e1, Standard Test Method for Measuring Coke Reactivity Index (CRI) and Coke Strength After Reaction (CSR), ASTM International, West Conshohocken, PA, 2010.

Clean coke process: process development studies by USS Engineers and Consultants, Inc., Wisconsin Tech Search, request date Oct. 5, 2011, 17 pages.

Rose, Harold J., "The Selection of Coals for the Manufacture of Coke," American Institute of Mining and Metallurgical Engineers, Feb. 1926, 8 pages.

U.S. Appl. No. 14/655,204, filed Jun. 24, 2015, Quanci, John F., et al.

U.S. Appl. No. 14/839,384, filed Aug. 28, 2015, Quanci, John F., et al.

U.S. Appl. No. 14/839,493, filed Aug. 28, 2015, Quanci, John F., et al.

U.S. Appl. No. 14/839,551, filed Aug. 28, 2015, Quanci, John F., et al.

U.S. Appl. No. 14/839,588, filed Aug. 28, 2015, Quanci, John F., et al.

U.S. Appl. No. 14/885,581, filed Sep. 25, 2015, Sarpen, Jacob P., et al.

U.S. Appl. No. 14/959,450, filed Dec. 4, 2015, Quanci et al.
U.S. Appl. No. 14/983,837, filed Dec. 30, 2015, Quanci et al.
U.S. Appl. No. 14/984,489, filed Dec. 30, 2015, Quanci et al.
U.S. Appl. No. 14/986,281, filed Dec. 31, 2015, Quanci et al.
U.S. Appl. No. 14/987,625, filed Jan. 4, 2016, Quanci et al.
Chinese Office Action in Chinese Application No. 201280075315.1, mailing date Oct. 12, 2016.
U.S. Appl. No. 15/281,891, filed Sep. 30, 2016, Quanci et al.
U.S. Appl. No. 15/139,568, filed Apr. 27, 2016, Quanci et al.
Basset, et al., "Calculation of steady flow pressure loss coefficients for pipe junctions," Proc Instn Mech Engrs., vol. 215, Part C. IMechIE 2001.

Costa, et al., "Edge Effects on the Flow Characteristics in a 90 deg Tee Junction," Transactions of the ASME, Nov. 2006, vol. 128, pp. 1204-1217.

Waddell, et al., "Heat-Recovery Cokemaking Presentation," Jan. 1999, pp. 1-25.

Westbrook, "Heat-Recovery Cokemaking at Sun Coke," AISE Steel Technology, Pittsburg, PA, vol. 76, No. 1, Jan. 1999, pp. 25-28.

Yu et al., "Coke Oven Production Technology," Lianoning Science and Technology Press, first edition, Apr. 2014, pp. 356-358.

"Resources and Utilization of Coking Coal in China," Mingxin Shen ed., Chemical Industry Press, first edition, Jan. 2007, pp. 242-243, 247.

Chinese Office Action in Chinese Application No. 201280075315.1, mailing date May 27, 2016.

\* cited by examiner

METHODS FOR HANDLING COAL PROCESSING EMISSIONS AND ASSOCIATED SYSTEMS AND DEVICES

CROSS-REFERENCE TO RELATED APPLICATION

This application claims the benefit of U.S. Provisional Application No. 61/678,018, filed Jul. 31, 2012, which is incorporated herein by reference in its entirety.

TECHNICAL FIELD

The present technology is generally directed to systems and methods for handling emissions. More specifically, some embodiments are directed to systems and methods for collecting heated particulate from a coal processing system.

BACKGROUND

A bag house or fabric filter is an air pollution control device that removes particulate out of air or gas released from commercial processes. A bag house can include fabric filter bags, which are oval or round tubes, typically 15-30 feet long and 5 to 12 inches in diameter. The bags can be made of woven or felted material and can have varying degrees of filtering capabilities. The bags are used as a way to meet increasingly stringent air pollution control requirements. However, industrial applications that produce airborne sparks as well as heated dust and particulate cannot use bag houses or fabric filter materials alone due to the potential for fabric filter fires. More specifically, the filtering bags can be combustible, and if hot particulate touches the bag surface, the bags will begin to smolder and eventually burn. Further, combustible material can destroy even non-combustible bags, such as fiberglass bags.

A spark arrestor is a generic term describing a device that is intended to prevent combustible materials, such as sparks or heated particulate, from escaping into areas that could result in ignition and fire, such as a bag house. Spark arresting devices have been used in emissions control processes with limited success, depending on the gas flow volumes and particle sizes. Many conventional spark arresting devices have not adequately stopped hot particles from entering bag houses. Resulting bag fires lead to production downtown and costly repairs. Accordingly, there exists a need for improved emissions handling systems.

DETAILED DESCRIPTION

The present technology describes various embodiments of systems and methods for handling emissions. More specifically, some embodiments are directed to systems and methods for collecting heated particulate from a mineral processing (e.g., coal processing) system. In one embodiment, a method of handling emissions from a coal processing system includes inletting the emissions into a duct. The emissions include heated particulate. The method further includes slowing a speed of the emissions traveling through the duct and disengaging the heated particulate from the emissions without the use of a physical barrier. In some embodiments, the heated particulate is slowed, cooled, and diverted from an emissions pathway into a collection bin. In several embodiments, the present technology can be used for pollution control. More specifically, the present technology can be used for the treatment of waste gases, separation of particles dispersed in gas or vapor, and/or uptake or absorption of dust.

Specific details of several embodiments of the technology are described below with reference to FIGS. 1-3C. Other details describing well-known structures and systems often associated with emissions handling and/or coal processing have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1-3C.

Figure 1:
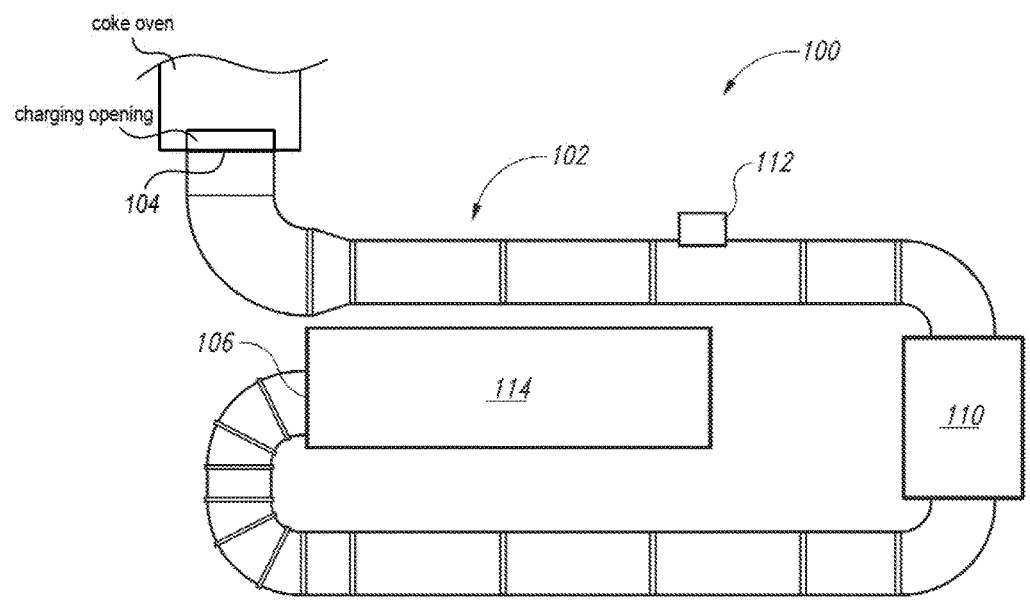
FIG. 1 is a partially schematic top view of an emissions handling system configured in accordance with embodiments of the technology.
Figures 2A, 2B:
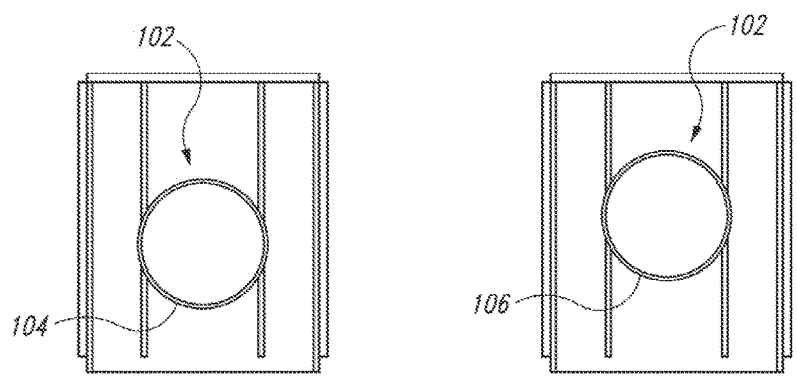
FIG. 2A is a front view of an inlet to the emissions handling system configured in accordance with embodiments of the technology.
FIG. 2B is a front view of an outlet of the emissions handling system configured in accordance with embodiments of the technology.

FIG. 1 is a partially schematic top view of an emissions handling system 100 configured in accordance with embodiments of the technology. In several embodiments, the system 100 is configured to handle or process emissions having heated particulate. In some embodiments, the system 100 is configured to handle combustible particulate. The system 100 includes a housing 102 having an inlet 104, an outlet 106, and a length of duct extending between the inlet 104 and the outlet 106. FIG. 2A is a front view of the inlet 104 to the emissions handling system 100 and FIG. 2B is a front view of the outlet 106. Referring to FIGS. 1-2B together, the housing 102 can have a rectangular, circular, or other shaped cross-section, or a variety of shapes at different points along the duct. Further, the diameter of the housing 102 can be continuous or vary along the length of duct. For example, as will be described in further detail below, in some embodiments the housing 102 has a smaller diameter at the inlet 104 and/or outlet 106 than at a point between the inlet 104 and outlet 106. In some embodiments the system 100 can operate at negative pressure using, for example, an induced draft fan.

The system 100 can include various components upstream, or proximal, to the inlet 104 and/or downstream, or distal, to the outlet 106. For example, the emissions can enter the inlet 104 from a coal processing component. After passing through the system 100, the emissions can travel through the outlet 106 to a bag house 114, fabric filter, or other air pollution control device to further remove particulate from the emissions. For example, in some embodiments, the system 100 can include an electrostatic precipitator within the housing 102 or downstream of the outlet 106. An electrostatic precipitator can be in addition to or in place of the bag house 114. In further embodiments, after treatment by the system 100, the emissions can be vented or otherwise handled.

As will be described in further detail below, the housing 102 can comprise an elongated pathway, a tortuous or serpentine pathway, a straight pathway, and/or other configuration. The length of the housing 102 can vary in different embodiments of the technology. For example, in one embodiment, the system 100 fits within the footprint of the bag house 114. In particular embodiments, the housing 102 has a length from about 75 feet to about 125 feet. The length of the housing 102 can be selected to give the heated particulate traveling in the emissions sufficient residence time in the housing 102 to adequately cool prior to reaching the bag house 114.

In some embodiments, the housing 102 comprises a plurality of individual duct sections coupled together with fasteners. The individual sections may have the same, similar, or different attributes. For example, in several embodiments, the housing 102 includes an inertial separator 110 having different cross-sectional dimensions (e.g., a larger cross-sectional diameter) than other portions of the housing 102. The inertial separator 110 can comprise any collection control device configured to control the speed of or slow the emissions, redirect heated particles from the emissions stream, and/or cool the emissions. As will be described in further detail below with reference to FIGS. 3A-3C, in some embodiments, the inertial separator 110 comprises one or more baffles, "knock-out" surfaces, or impingement plates configured to knock particulates out of the emissions stream into a collection bin. In several embodiments, the system 100 lacks a physical barrier (e.g., a screen or mesh spark arrestor) to intercept the emissions. As will be discussed in further detail below, the absence of such a screen can reduce the instance of plugging, overheating, and fires within the system 100.

The system 100 can further include a cooling source 112 configured to cool the emissions traveling in the housing 102. In one embodiment, the cooling source 112 comprises an air inlet configured to allow cooled or ambient air into the housing 102. The cooling source 112 can comprise a cooling air inlet with a damper configured to automatically modulate based on a temperature reading of the emissions. In one embodiment, for example, the damper is electrically controlled and is coupled to a programmable logic controller configured to read a temperature sensor and send damper modulation instructions to the air inlet in response to the sensor reading. In further embodiments, other types of sensors (e.g., pressure, emissions concentration, etc.) can provide feedback that determines damper modulation. In still further embodiments, the damper could be modulated on a fixed schedule or manually, without the use of electrical control. In further embodiments, the damper itself can be responsive to temperature without the use of a sensor. For example, the damper can be comprised of a temperature-sensitive material that automatically adjusts based on ambient temperature. In another embodiment, the inertial separator 110 can comprise the cooling source 112. For example, cooling air or water can flow through and/or be distributed by vents in baffles in the inertial separator 110. In still further embodiments, cool air can be introduced in a countercurrent direction (e.g., in a direction counter to the flow of emissions through the housing 102), thereby both cooling and slowing the emissions.

In embodiments utilizing a sensor, the sensor can be located anywhere in the system, such as at the inlet 104, outlet 106, inertial separator 110, upstream of the inlet 104, and/or downstream of the outlet 106 (e.g., at or near the entrance to the bag house 114), or a combination of these locations. In still further embodiments, the cooling source 112 can be pneumatically or otherwise controlled. In several embodiments, the system 100 can continue to run while the cooling air intake damper is open. While the cooling source 112 is illustrated as upstream of the inertial separator 110, it can be located at or near the inlet 104, the outlet 106, the inertial separator 110, downstream of the inertial separator, upstream of the inlet 104, or at another location. In some embodiments, the system 100 includes a plurality of sensors and/or cooling sources 112, working either independently or collaboratively.

The system 100 can additionally or alternately include other cooling features, such as heat exchanger surfaces (e.g., fins, rods, studs, etc.) on the interior or exterior of the housing 102. In still further embodiments, other cool gases/fluids can be introduced into the housing 102. In one embodiment, water or other fluid can be directly injected into the housing 102 (e.g., at or near the inlet 104 or the outlet 106, or along the duct). The water can evaporate and cool the emissions. In some embodiments, the system 100 can include fans (e.g., external to the housing 102) configured to force convection across the housing 102 and increase heat transfer. In still further embodiments, as mentioned above, the housing cross-sectional diameter can be increased as the emissions travel downstream, thereby slowing the air velocity and the emissions velocity. This can result in an increased residence time for a fixed length of duct and allow for additional cooling. In operation, reducing the air velocity provides longer residence time and allows particulates to settle out of the emissions flow and collect, for example, in the collection bin. The longer residence time can further allow combustible particles sufficient time to cool and/or burn out.

Figure 3A:
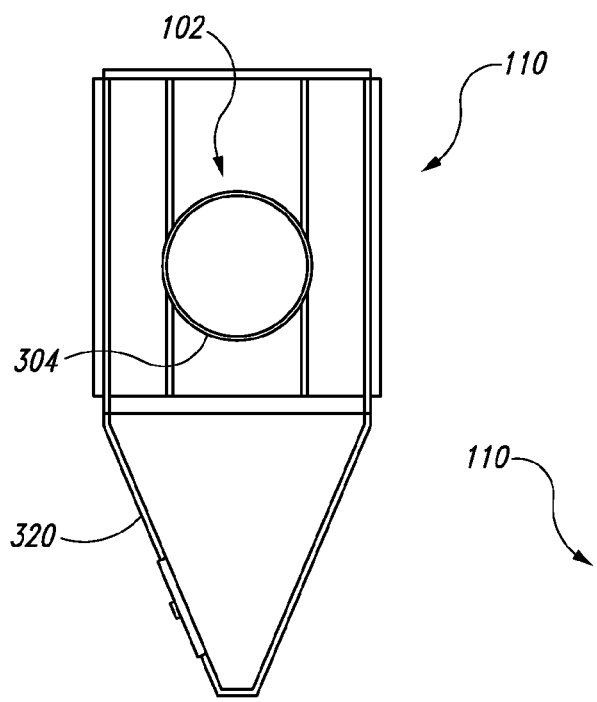
FIG. 3A is a front view of an inlet to an inertial separator portion of the emissions handling system configured in accordance with embodiments of the technology.
Figure 3B:
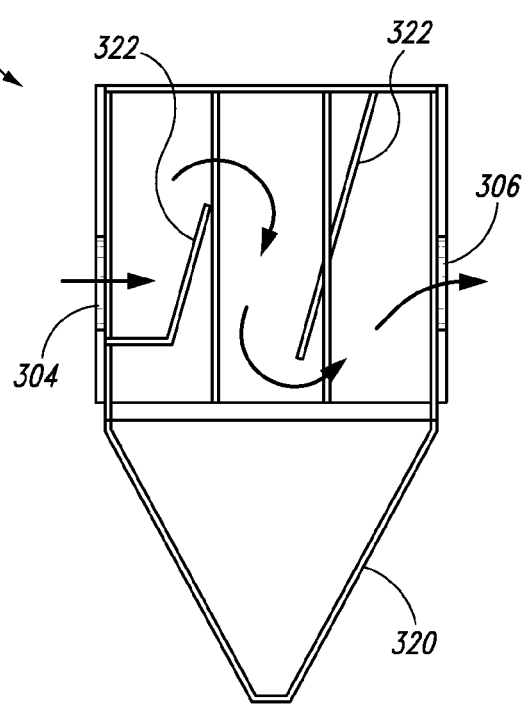
FIG. 3B is a side, cutaway view of the inertial separator portion configured in accordance with embodiments of the technology.
Figure 3C:
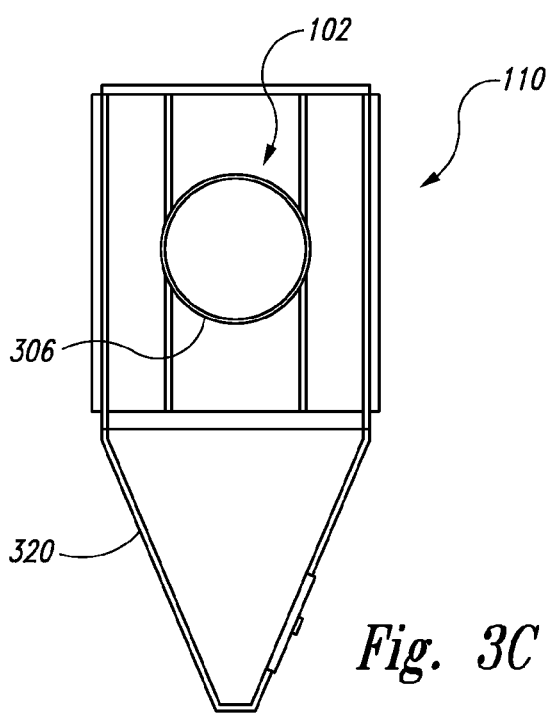
FIG. 3C is a front view of an outlet of the inertial separator portion configured in accordance with embodiments of the technology.

FIGS. 3A-3C provide further detail of the inertial separator portion 110 of the housing 102. More specifically, FIG. 3A is a front view of an inlet 304 to the inertial separator 110, FIG. 3B is a side, cutaway view of the inertial separator, and FIG. 3C is a front view of an outlet 306 of the inertial separator 110 configured in accordance with embodiments of the technology. Referring to FIGS. 3A-3C together, the inertial separator 110 can include one or more baffles 322 configured to slow the emissions stream (shown with arrows) and interface with heated particulate. The baffles 322 can knock particles from the emissions stream into a collection bin 320. In the illustrated embodiment, the baffles 322 are angled, but can be straight or more or less angled with reference to a horizontal plane. In the illustrated embodiment, the collection bin 320 is a funnel-shaped hopper that allows particulates to be readily removed from the base. In other embodiments, the collection bin 320 comprises a tray or other-shaped feature.

As discussed above, the inertial separator 110 can have the same or different cross-section dimensions at other portions of the housing 110. For example, in the illustrated embodiment, the inertial separator 110 has a larger cross-section than the duct upstream and downstream of the inertial separator 110. The upstream diameter is represented by the diameter of the inlet 304 and the downstream diameter is represented by the diameter of the outlet 306. By having an inertial separator 110 with a wider cross-section than the upstream portion of the duct, the emissions velocity is lowered, providing more cooling time, and the amount of particulate that will exit the bin due to lift is reduced.

In further embodiments, other types of inertial separators 110 can be used to separate particles from the emissions stream. For example, in some embodiments, a cyclone or multi-cyclone separator can be used with a gas exhaust in the housing 102 to spin the emissions and disengage heated particles. In another embodiment, the inertial separator 110 can comprise an electrostatic precipitator. In yet another embodiment, the inertial separator comprises a settling chamber. In still another embodiment, baffles 322 can be arranged in a chevron pattern to create a tortuous pathway to slow the emissions sufficiently to disengage particulate. In yet another embodiment, a bin with a relatively high cross-sectional area can be placed along a base of the housing 102 in order to reduce lift velocity. This can allow the particulate to settle in the bin and be captured rather than re-fluidized in the exiting gas. In still further embodiments, other methods known in the art can be used to slow the emissions and/or change the direction of the emissions so as to disengage particulate from the emissions stream. In some embodiments, a physical spark arrestor can be used or combined with any of these embodiments. For example, with reference to FIG. 1, a physical barrier spark arrestor can be placed in the housing 102 between the inertial separator 110 and the outlet 106. For example, in a particular embodiment, a screen spark arrestor can be placed in an upper portion of the housing 102, thereby configured to slow down or capture errant particulates that have not yet fallen into the collection bin 320.

Examples

1. A method of handling emissions, comprising:
    inletting the emissions into a duct, the emissions including heated particulate;
    slowing a speed of the emissions traveling through the duct; and
    disengaging the heated particulate from the emissions without the use of a physical barrier.
2. The method of example 1, further comprising interfacing the emissions with baffle.
3. The method of example 1, further comprising collecting the heated particulate in a collection bin.
4. The method of example 3 wherein inletting the emissions into a duct comprises inletting the emissions via an inlet having a first cross-sectional diameter, and wherein collecting the heated particulate in a collection bin comprises collecting the particulate in a collection bin having a second cross-sectional diameter greater than the first cross-sectional diameter.
5. The method of example 1, further comprising inletting cooling gas into the duct.
6. The method of example 5 wherein inletting cooling gas into the duct comprises automatically adjusting a modulating damper.
7. The method of example 6 wherein automatically adjusting the modulating damper comprises automatically adjusting the damper in response to an emissions temperature.
8. The method of example 1, further comprising controlling a residence time of the emissions in the duct.
9. The method of example 1 wherein inletting the emissions into a duct comprises inletting the emissions into a duct having an elongated or tortuous duct pathway.
10. A system for handling emissions, comprising:
    a source of the emissions, the emissions including heated particles;
    a housing comprising an inlet in communication with the source, an outlet, and an elongated duct extending from the inlet to the outlet;
    an inertial separator positioned in the housing and configured to interface with the emissions; and
    a collection bin configured to collect the heated particles.
11. The system of example 10 wherein the inertial separator comprises at least one of a cyclone generator, settling chamber, electrostatic precipitator, or an impingement plate.
12. The system of example 10, further comprising a cooling system configured to automatically cool the emissions in response to a temperature reading of the emissions.
13. The system of example 10 wherein the duct comprises at least one of a tortuous pathway or a plurality of heat-exchanging surfaces.
14. The system of example 10, further comprising an injector coupled to the duct and configured to inject at least one of cooling air, cooling gas, or cooling fluid into the duct.
15. The system of example 10 wherein the housing lacks a screen spark arrestor.
16. The system of example 10 wherein the emissions comprise charging emissions from a coke oven.
17. The system of example 10 wherein the emissions comprise combustible particulate.
18. A system for handling emissions from a coke oven, comprising:
    a housing comprising an inlet configured to receive the emissions, an outlet, and a duct extending from the inlet to the outlet;
    a collection bin configured to collect hot particulate from the emissions; and
    a cooling gas intake damper configured to automatically modulate based on a temperature reading of the emissions.
19. The system of example 18 wherein the cooling gas intake damper is configured to modulate based on a temperature reading of the emissions at or distal to the outlet.
20. The system of example 18 wherein the cooling gas intake damper comprises an electrically-controlled damper.
21. The system of example 18, further comprising an impingement plate, cyclone generator, electrostatic precipitator, or settling chamber, configured to slow the emissions in the duct.
22. The system of example 18 wherein the housing lacks a physical barrier spark arrestor.
23. A system for handling emissions, comprising:
    a source of the emissions, the emissions including heated particles; and
    a housing comprising an inlet in communication with the source, an outlet, and an elongated duct extending from the inlet to the outlet, the elongated duct comprising a duct length configured to provide a predetermined residence time of emissions traveling in the duct.
24. The system of example 23, further comprising a cooling source coupled to the duct and configured to inlet at least one of cooling gas or cooling fluid into the duct.

25. The system of example 23, further comprising an impingement plate, cyclone generator, electrostatic precipitator, or settling chamber, configured to interface with the emissions traveling in the duct.

26. The system of example 23 wherein the housing lacks a physical barrier spark arrestor.

The present technology offers several advantages over traditional systems. For example, the inertial separation can reduce the occurrence of downstream bag house fires by preventing hot particles from entering the bag house without adequate cooling. The present technology cools the emissions and intercepts heated particulate before it reaches the bag house. Further, the cooling air inlet and associated sensor/feedback system can be proactive, to cool the housing as necessary rather than reacting to a potentially problematic high-heat condition. In several embodiments, the present system requires no physical barrier or screen spark arrestor, which can be frequently plugged and cause a high differential pressure to develop and push material through the screen and into the bag house.

From the foregoing it will be appreciated that, although specific embodiments of the technology have been described herein for purposes of illustration, various modifications may be made without deviating from the spirit and scope of the technology. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

We claim:

1. A method of handling charging emissions from a coke oven, comprising:
    providing a coke oven;
    positioning an inlet of a housing adjacent to, and in fluid communication with, a charging opening of the coke oven, which is configured to produce coke by driving gaseous volatile matter from carbon material through pyrolysis;
    drawing charging emissions from the coke oven into the housing inlet and an elongated duct that extends along a serpentine pathway from the housing inlet to a housing outlet; the charging emissions including combusted and uncombusted gaseous volatile matter, combustible particulate, and heated particles from a coke manufacturing process;
    drawing the charging emissions along a fluid pathway through an inertial separator positioned in the housing; the inertial separator including an inlet, having a first cross-sectional diameter, and an outlet and at least one impingement plate positioned within the fluid pathway, whereby the emissions are directed along a tortuous pathway around the at least one impingement plate and heated particles engage the at least one impingement plate and are forced from the emissions, which exit the outlet;
    collecting heated particles travelling through the inertial separator in a collection bin, having a second cross-sectional diameter greater than the first cross-sectional diameter, configured to slow the heated particles travelling through the inertial separator; and
    receiving at least a portion of the charging emissions in a baghouse coupled with the housing outlet.

2. The method of claim 1 wherein at least some of the heated particles are forced from the emissions with an electrostatic precipitator associated with the inertial separator.

3. The method of claim 1, further comprising the step of automatically cooling the charging emissions with a cooling system in response to a temperature reading of the charging emissions.

4. The method of claim 1, further comprising the step of injecting at least one of cooling air or a cooling gas into the duct with an injector coupled to the duct.

5. The method of claim 1 wherein the heated particles forced from the emissions without passing the charging emissions through a screen spark arrestor.

6. The method of claim 1 wherein a first impingement plate is positioned at first side of the inertial separator to extend within the fluid pathway and a second impingement plate is positioned at a second side of the inertial separator, opposite from the first side, within the fluid pathway, whereby the emissions are directed along a serpentine pathway around the first impingement plate and second impingement plate before exiting through the outlet.

* * * * *

UNITED STATES PATENT AND TRADEMARK OFFICE
CERTIFICATE OF CORRECTION

PATENT NO. : 9,683,740 B2
APPLICATION NO. : 13/631215
DATED : June 20, 2017
INVENTOR(S) : Bradley Thomas Rodgers et al.

Page 1 of 1

It is certified that error appears in the above-identified patent and that said Letters Patent is hereby corrected as shown below:

On the page 4, in Column 2, under "Other Publications", Line 55, delete "Lianoning" and insert -- Liaoning --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*